Feb. 6, 1951          I. SHUR          2,540,693
LOCKING SLIDER FOR SLIDE FASTENERS
Filed April 1, 1949
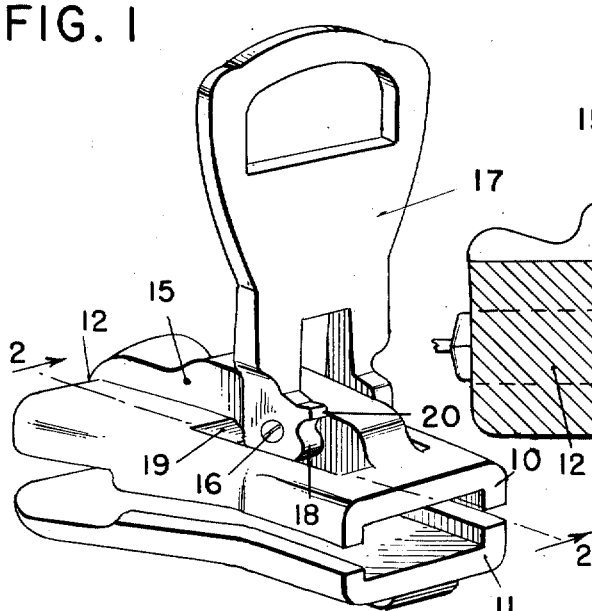
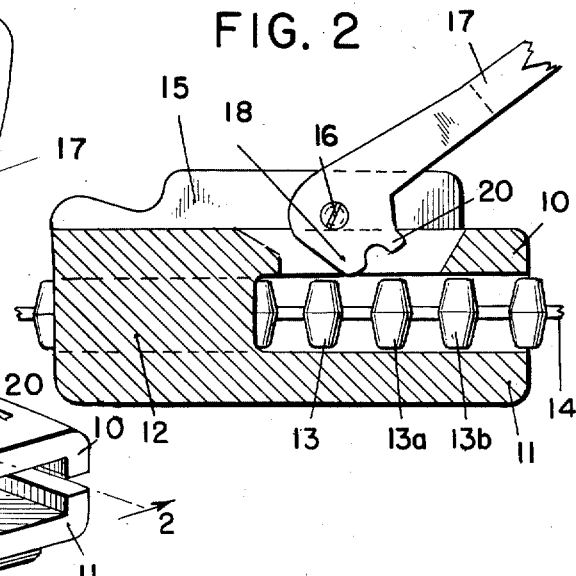
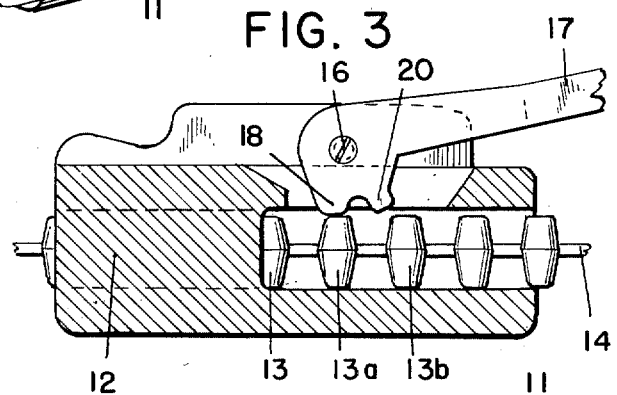
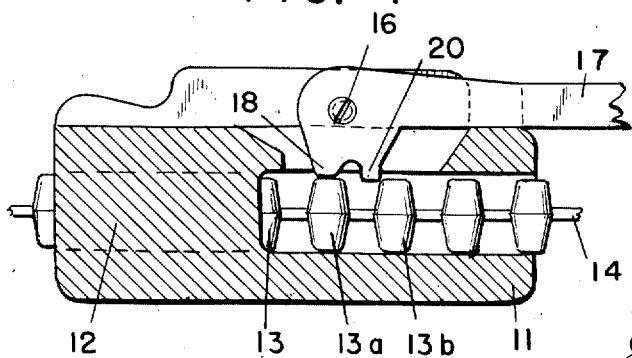
*INVENTOR.*
IRA SHUR,
BY
Attorney Patented Feb. 6, 1951

2,540,693

UNITED STATES PATENT OFFICE 2,540,693

LOCKING SLIDER FOR SLIDE FASTENERS

Ira Shur, Brooklyn, N. Y., assignor to Waldes Kohinoor, Inc., Long Island City, N. Y., a corporation of New York Application April 1, 1949, Serial No. 84,795

4 Claims. (Cl. 24—205.14)

This invention relates to improvements in locking sliders for slide fasteners, and more particularly to an improved locking slider for a plastic slide fastener wherein the fastener elements are usually connected to their tapes direct in the molding process.

Locking sliders designed to secure the fastener of which they form a part against unintentional opening at any point of slider travel, are of two principal types. One type is the so-called pin lock slider whose pull tab is provided with a pin-like locking member adapted to extend through an opening in the slider upper wing into the space between two adjacent fastener elements of the same row thereof within the slider body when the pull tab is in its lowered or "at rest" position. The other principal type is the so-called cam lock slider in which a cam member integrally connected with the pull tab eccentrically of its pivot is adapted to be projected through the window of the slider upper wing upon lowering of the pull tab to engage upon the upper face of a fastener element and thus frictionally arrest relative movement between slider and fastener elements.

A pin lock slider as aforesaid exerts secure locking action on metal fasteners when the pin is made sufficiently long as to project a substantial depth into the space between two adjacent fastener elements. However, this type of locking slider is not well adapted for use with plastic slide fasteners, due to the fact that plastic material, even of the most resistant type, such as nylon, is inherently more liable to distortion or dislocation than metal. If the locking pin is made so long as to provide a positive, reliable lock, there is the danger, in plastic slide fasteners, that when a strong sidewise pull is applied to the fastener above the slider, as tends to result in unintentional opening of the fastener, the locking pin may distort or dislocate the element or elements engaged thereby, thus rendering the fastener useless. Thus, when a pin lock type slider is employed in a plastic slide fastener, the solution must be found in a compromise between a locking pin long enough to provide the desired locking action under normal conditions but not long enough as to be liable to distort or dislocate the plastic elements which are sensitive to damage. Although the compromise locking pin is effective under normal conditions, there is the danger that, in the case of a particularly strong force applied to the fastener in transverse direction above the slider, the pin may slide over the elements, thereby rendering the locking action ineffective.

On the other hand, the cam lock slider is open to objection because a metal locking cam may easily slide off a plastic fastener element, with the result that the frictional locking action provided by a cam lock slider when used with plastic slide fasteners is less secure than is desirable.

The present invention aims at eliminating the drawbacks of both the pin lock and cam lock types of locking sliders and, instead, to provide a locking slider for slide fasteners, particularly of the plastic type, which is capable of positively locking the slider to fastener chain without damaging or dislocating the plastic fastener elements, even under severe forces applied to the fastener above the slider.

Another object of the invention is to provide a locking slider especially designed for plastic slide fasteners, which is of simple shape such that it can easily be formed in a mold.

Still another object of the invention is the provision of a locking slider which is semi-automatic in its operation, whereby the pull tab will automatically move to its locking position upon the fastener being subjected to a lateral force above the slider, and will be maintained in its locking position until positively raised therefrom.

A further object of the invention is the provision of a locking slider combining the features of advantage of the prior pin and cam lock sliders, and in which a cam and a pin lock are cooperated in such a way as not only to provide a secure locking effect for plastic slide fasteners but also as to render the slider semi-automatic in its operation.

The above and other objects and features of advantage of the improved locking slider of the invention will be apparent from the following detailed description taken with the accompanying drawing, wherein—

Fig. 1 is a perspective view of a slider according to the invention, the pull tab being shown in full raised position to illustrate the combined cam and pin lock of the invention;

Fig. 2 is a section taken along line 2—2 of Fig. 1, illustrating the pull tab in normal raised position;

Fig. 3 is a view similar to Fig. 2, illustrating the automatic lowering action of the slider pull tab; and Fig. 4 is a view similar to Figs. 2 and 3, illustrating the pull tab in its locking or "at rest" position, in which the combined cam and pin locks have their full locking effect.

Referring to the drawings, Fig. 1 illustrates a conventional slider having an upper wing 10 and a lower wing 11 which are connected by a neck 12 which also serves as a divider for spreading the fastener elements 13, 13a, 13b (Figs. 2, 3, 4) of the rows thereof when the slider is actuated in downward direction or to the right. In the fastener illustrated, the fastener elements are assumed to be formed or plastic material, being connected to their tapes 14 in the process of molding the elements.

The upper wing 10 of the illustrated slider is formed with a longitudinally extending lug 15 to which is hingedly connected, by means of a transverse hinge pin 16, a pull tab 17 for manually actuating the slider in its opening or closing movement, as is generally understood in the art. Integral with the pull tab and depending its upper edge to extend through an opening 19 provided in the upper wing 10 is a combination locking means comprising a cam locking member 18 and spaced therefrom a pin locking member 20, the cam member being eccentric to the axis of the hinge pin 16 and leading the pin member 20 in the lowering movement of the pull tab by an amount such that the cam and pin members are spaced substantially half the pitch distance between the adjacent fastener elements of the rows thereof. The length of the cam member 18 is such that in the normal raised position of the pull tab 17 illustrated in Fig. 2 its lower, rounded end projects a slight distance into the body of the slider and, that when the pull tab is in its locking or "at rest" position shown in Fig. 4, said lower end engages flat on and presses firmly against the top surface of a fastener element disposed below the same. The locking pin 20 has greater length, as measured from the axis of hinge pin 16, than the cam member 18, but according to the invention the locking pin is shorter than the locking pins which are provided on locking sliders for use with metal slide fasteners. That is to say, the locking pin 20 extends a relatively short distance into the space between adjacent fastener elements so that, considering its length and its spacing from the cam member 18, it is adapted to engage against the upper top corner of the fastener element following the element engaged by the cam member 18.

In normal operation, the pull tab 17 is raised to its angular position shown in Fig. 2, in which both cam and pin members 18, 20 have cleared the elements. In such position, the slider may be actuated freely in either fastener opening or fastener closing direction. If in this position of the pull tab a lateral force is applied to the fastener above the slider, and with the pull tab tending to lower under its own weight, any lateral force applied to the fastener above the slider will cause the slider to move downwardly or to the right by a small amount. Since cam member 18 now extends a slight distance into the slider body, such movement will result in the lower or nose end of the cam engaging against the upper corner of the fastener element 13a, this engagement now causing the pull tab to lower in automatic manner. Assuming continuance of the force applied to the fastener above the slider, the lower or nose end of the cam member rolls on the top surface of the fastener element 13a and thereby effects full lowering of the pull tab to its locking or "at rest" position illustrated in Fig. 4. In such lowering movement, the pin member 20 has moved into the space between the elements 13a and the next following element 13b, to engage against the upper corner of the latter element. Consequent to the predetermined length of the cam and pin members, the cam member presses firmly against the top face of fastener element 13a and thus frictionally locks with same, and the pin member 20, by virtue of its engagement with fastener element 13b, also provides positive locking effect, which combines with the frictional locking effect provided by the cam member 18 in firmly locking the slider to fastener. Since cam member 18 is displaced by a small angle forwardly of the vertical plane containing the axis of hinge pin 16, it has a slight off-center relationship which is sufficient to maintain the pull tab in its locking position against substantial forces that might otherwise tend to raise the pull tab. Accordingly, when once the pull tab is lowered, it is maintained in its locking position until it is raised manually.

The combined slider locking means of the present invention thus serves two principal purposes. The cam member 18 thereof, when it engages a fastener element disposed in its path, will automatically lower the pull tab to its locking position and at the same time it provides a frictional lock with the element which it has engaged. This locking action combines with that of the locking pin 20 to secure the slider locked with relation to the fastener elements against substantial forces tending to move the slider in fastener opening direction. At the same time, the cam and pin lock combination of the invention eliminates the possibility of the elements engaged thereby being distorted or dislocated, since the cam member exerts frictional holding force on an element engaged thereby in vertical direction and as the length of the locking pin 20 is such that it does not extend a substantial distance into the space between two adjacent fastener elements engaged by the combination locking means.

As many changes could be made in carrying out the above construction without departing from the scope of the invention, it is intended that all matter contained in the above description or shown in the accompanying drawings shall be interpreted as illustrative and not in a limiting sense.

I claim:

1. A locking slider for slide fasteners comprising spaced upper and lower wings, a pull tab hingedly connected to the upper wing, and locking means integral with the pull tab and adapted to extend through an opening in the upper wing into locking engagement with two adjacent fastener elements of the same stringer contained in the slider when the pull tab is in its lowered position, said locking means comprising a cam locking member and a pin locking member spaced rearwardly of said cam locking member by approximately half the spacing of the adjacent fastener elements so that in the lowering movement of the pull tab the cam locking member engages against the top surface of one of said adjacent elements and the locking pin member extends into the space between said adjacent elements.

2. A locking slider for slide fasteners comprising spaced upper and lower wings, a pull tab hingedly connected to the upper wing, and locking means integral with the pull tab and adapted to extend through an opening in the upper wing into locking engagement with two adjacent fastener elements of the same stringer contained in the slider when the pull tab is in its lowered position, said locking means comprising a cam locking member and a pin locking member spaced from one another by approximately half the spacing of the two adjacent fastener elements, the cam locking member leading the pin locking member in the lowering movement of the pull tab and in its full lowered position locking against the top face of one of the adjacent elements, the pin locking member being longer than the cam locking member so as to extend a predetermined limited distance into the space between said adjacent elements.

3. A locking slider for slide fasteners comprising spaced upper and lower wings, a pull tab hingedly connected to the upper wing, and locking means integral with the pull tab and adapted to extend through an opening in the upper wing into locking engagement with two adjacent fastener elements of the same stringer contained in the slider when the pull tab is in its lowered position, said locking means including a cam locking member and a pin locking member spaced a distance corresponding to half the spacing of the adjacent fastener elements, the cam locking member being sufficiently long as to extend a limited distance into the slider body when the pull tab is in its normal raised slider-operating position, and to press firmly against the top face of one of the adjacent fastener elements when the pull tab is in its full lowered position, the pin locking member being longer than the cam locking member by a predetermined amount which is such that when the pull tab is in its full lowered position it extends into the space between the adjacent fastener elements but terminates well above the upper surface of the stringer tape.

4. A locking slider for slide fasteners comprising spaced upper and lower wings, a pull tab hingedly connected to the upper wing, and locking means integral with the pull tab and adapted to extend through an opening in the upper wing into locking engagement with two adjacent fastener elements of the same stringer contained in the slider when the pull tab is in its lowered position, said locking means comprising a leading cam locking member and a following pin locking member, the length and spacing of said locking members being such that the cam locking member effects lowering movement of the pull tab from its normal raised slider operating position upon the slider tending to move in fastener opening direction, and thereupon to press firmly against the top face of one of the adjacent fastener elements, and that the pin locking member extends a predetermined limited distance into the space between said adjacent elements when the pull tab is in its full lowered position.

IRA SHUR.

REFERENCES CITED

The following references are of record in the file of this patent:

UNITED STATES PATENTS

| Number | Name | Date |
|---|---|---|
| 1,938,812 | Dalton | Dec. 12, 1933 |
| 1,969,672 | Poux | Aug. 7, 1934 |
| 2,450,779 | Brozek | Oct. 5, 1948 |